United States Patent [19]

Steckler et al.

[11] Patent Number: 4,636,836
[45] Date of Patent: Jan. 13, 1987

[54] PHASE LOCKED LOOP SYSTEM FOR PROVIDING A PHASE SHIFTED OUTPUT SIGNAL

[75] Inventors: Steven A. Steckler, Clark; Alvin R. Balaban, Lebanon, both of N.J.

[73] Assignee: RCA Corporation, Princeton, N.J.

[21] Appl. No.: 677,524

[22] Filed: Dec. 3, 1984

[51] Int. Cl.⁴ .............................................. H04N 9/45
[52] U.S. Cl. ......................................... 358/19; 358/25
[58] Field of Search ...................... 358/13, 19, 25, 27, 358/28; 375/119

[56] References Cited

U.S. PATENT DOCUMENTS

| | | | |
|---|---|---|---|
| 3,806,635 | 4/1974 | Abbott et al. | 358/25 |
| 4,291,332 | 9/1981 | Kato et al. | 358/19 |
| 4,404,583 | 9/1983 | Tatami | 358/13 |
| 4,527,145 | 7/1985 | Haussmann et al. | 358/19 |

FOREIGN PATENT DOCUMENTS 0071506 7/1981 European Pat. Off. .

Primary Examiner—John W. Shepperd
Attorney, Agent, or Firm—E. M. Whitacre; P. J. Rasmussen; K. N. Nigon

[57] ABSTRACT

A phase locked loop system is described in the context of a digital television receiver. The system includes a band-pass filter which shifts the phase of burst samples provided to it by 33°. This phase shift makes the zero-crossing points of the filtered burst signal coincident with the I color difference signal sampling phase relative to the unfiltered burst signal. The phase locked loop uses a zero-crossing phase detector to develop a control signal for a VCO. The oscillatory signal provided by the VCO has a frequency of, for example, four times the frequency of the burst, but shifted in phase relative to the burst to allow sampling composite video signal coincident with the phase of at least one of the I and Q color difference signals.

22 Claims, 3 Drawing Figures

BAND PASS FILTER AND PHASE SHIFTER

PHASE LOCKED LOOP SYSTEM FOR PROVIDING A PHASE SHIFTED OUTPUT SIGNAL

This invention relates to apparatus for providing phase shifts in phase locked loop circuitry.

A phase locked loop (PLL) is used in a signal processing system to generate an oscillatory signal related in frequency and phase to a reference signal. Generally, the phase of the signal provided by the PLL is the same as the phase of the reference signal. However, there are applications where it may be desirable for the PLL to provide a signal that is locked to the reference signal but which has a predetermined phase angle offset relative to the reference signal.

One such application is in the color information signal processing apparatus of an NTSC color television receiver.

An NTSC composite video signal is a combination of a wide bandwidth luminance signal (e.g. 4.2 MHz) and a narrow bandwidth chrominance signal (e.g. 1.2 MHz). The chrominance signal is composed of two quadrature phase related color difference signals, the I and Q signals, which modulate a suppressed color subcarrier signal.

A necessary step in color signal processing is the separation of the color information signals from the composite video signal. In conventional digital television receivers, the composite video signal is sampled at four times the color subcarrier frequency, $4f_{sc}$, and the sampled signal is filtered to separate the luminance and chrominance components. When the phase and frequency of the sampling clock are properly aligned, chrominance samples obtained by this method occur as an alternating sequence of I and Q color difference signal samples (e.g. $+I$, $+Q$, $-I$, $-Q$, $+I$ . . . etc. where the signs indicate sample phase and not necessarily sample polarity). These chrominance samples may be separated into sequences of I and Q color difference signal samples by a demultiplexer.

The phase and frequency of the sampling clock are desirably held within narrow tolerances to ensure proper recovery of the color information carried by the color difference signals. Conventional digital television signal processing apparatus synchronizes the sampling clock to the color synchronizing burst component of the composite video signal. This component is eight to eleven cycles of the chrominance subcarrier that is included in the burst interval of each horizontal line of a composite video signal which contains video information. In the NTSC standard, however, the phase of the burst signal differs by 33° from the phase of the sampling clock that is desirable for recovering the I and Q color difference signals.

Several methods have been proposed to synchronize the sampling clock to the burst but at a different phase. One method is disclosed in published European patent application No. 0,071,506 entitled "Digital Method And Device For Correction Of Phase Error In A Sampled Signal And Application Thereof To The Correction Of Television Signals". The apparatus described in this application employs both a band-pass filter and a phase shifter to obtain phase shifted chrominance information from composite video signals.

A second method is described in published European Patent Application No. 0,074,597 entitled "Method And Arrangement For Digital Control Of The Phase Of The System Clock Of A Digital Signal Processing System". The disclosed system includes a phase locked loop in which a reference value is subtracted from the burst samples before they are applied to a zero-crossing phase detector. The phase detector accumulates the magnitudes of one zero-crossing sample from each burst cycle to produce a control signal that is used to adjust the frequency of a voltage controlled oscillator (VCO). When the system has stabilized, the frequency and phase of the signal provided by the VCO are held at values which produce a zero-valued control signal. This signal differs in phase from the burst by the reference phase angle.

The accuracy of this system depends on the accuracy of the value subtracted from the burst samples. This value is a function of the magnitude of the burst samples and so, is sensitive to variations in signal strength and to noise.

A third phase locking system which is less sensitive to changes in burst amplitude is disclosed in U.S. Pat. No. 4,291,332 entitled "Phase-Locked Circuit". This system calculates the sine and cosine of the phase difference between the sampling clock and the burst by accumulating selected samples in each burst cycle. The samples corresponding to the cosine of the phase angle are multiplied by a reference value equal to the tangent of a reference angle. The value produced by the multiplier is subtracted from the accumulated cosine samples to produce a control signal for a VCO. The VCO stabilizes when the clock signal—derived from the VCO output signal—and the burst signal have a phase difference equal to the reference angle. This method relies on the relative amplitudes of two points on the burst waveform and accumulates samples of these points over an entire burst interval to generate the VCO control signal. Consequently, it is relatively insensitive to changes in burst amplitude.

Although this third method of phase control is less sensitive to variations in the amplitude of the burst signal, it is more expensive to implement than the second method since it uses more complex arithmetic elements.

SUMMARY OF THE INVENTION

The present invention is a phase-locked loop system including a filter which both removes spurious out of band components from a reference signal applied to its input port and provides a signal at its output port having a predetermined phase relationship with respect to the reference signal. Signals provided by the filter are applied to a phase detector which develops a control signal for a VCO. The signal provided by the VCO determines the phase angle at which the reference signal is sampled.

DETAILED DESCRIPTION

Figure 1:
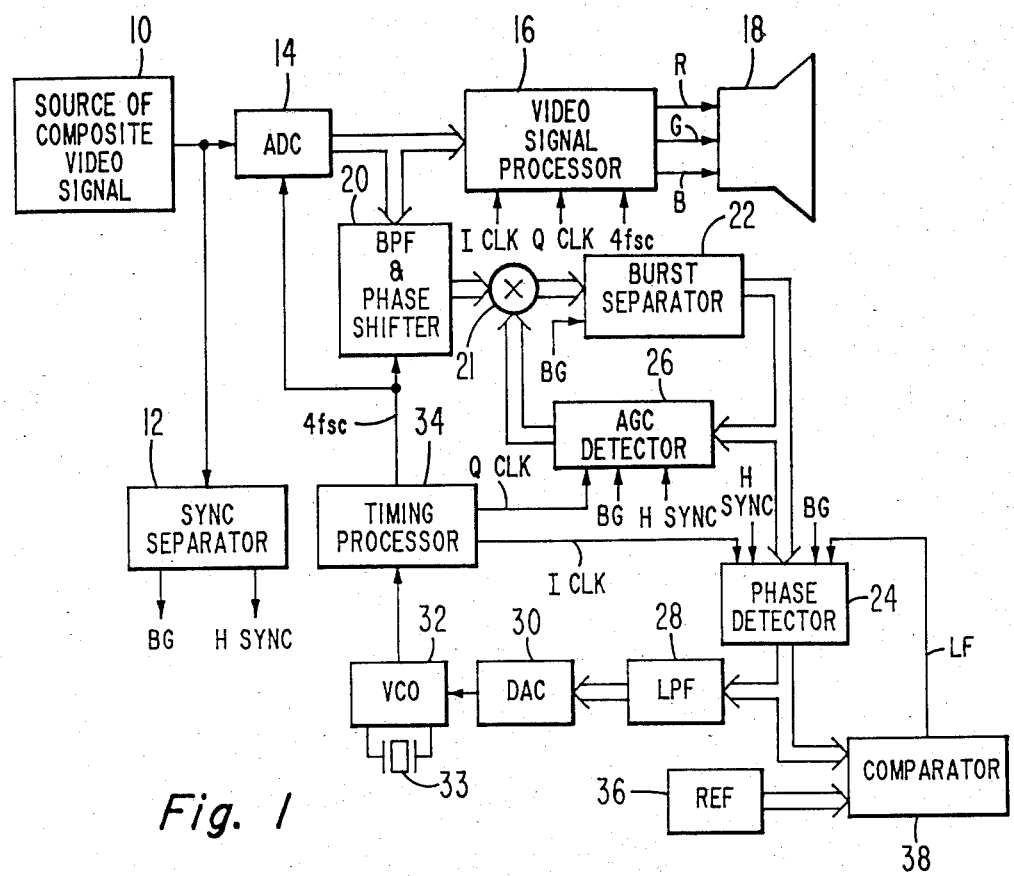
FIG. 1 is a block diagram of a phase locked loop system embodying the present invention in the environment of a digital television receiver.

In the drawings, broad arrows represent busses for multiple-bit parallel digital signals. Line arrows represent connections carrying analog signals or single bit digital signals. Depending on the processing speed of the devices, compensating delays may be required in certain of the signal paths. One skilled in the art of digital circuit design would know where such delays would be needed in a particular system.

In FIG. 1, a source of composite video signal 10, which may include the tuner, intermediate frequency amplifier and video detector of a conventional television receiver, applies base-band analog composite video signals to sync separator 12 and to analog to digital converter (ADC) 14. Sync separator 12 may be a conventional circuit which separates the horizontal synchronization pulses from an analog composite video signal and generates a burst gate signal, BG. The horizontal synchronization signal, H SYNC, provided by separator 12 is in a logic high state for the duration of each horizontal sync pulse and in a logic low state otherwise. The burst gate signal, BG, is in a logic high state during the burst interval of each horizontal line for four complete cycles of the burst signal and in a logic low state otherwise. These signals are used in the phase locked loop circuitry as explained below.

ADC 14, under control of a $4f_{sc}$ clock signal from timing processor 34, samples the analog composite video signal and produces digital samples representing the analog samples. ADC 14 may be a conventional flash ADC which provides, for example, seven-bit digital samples. These samples are applied to video signal processor 16. Processor 16 may, for example, separate the luminance components and the I and Q color difference signal components from the composite video samples, and process these components into primary color signals R, G and B which are applied to a display device 18. Video signal processor 16 is controlled by the clock signals $4f_{sc}$, I CLK and Q CLK. These signals are provided by timing processor 34, which is synchronized to the color burst reference component of the composite video signals by a phase-locked loop (PLL).

Composite video samples from ADC 14 are applied to band-pass filter and phase shifter 20. Band-pass filter and phase shifter 20 removes spurious high and low frequency noise components from the composite video samples and provides burst samples at its output port which are shifted in phase by 33° with respect to the burst samples applied to its input port.

Figure 2:
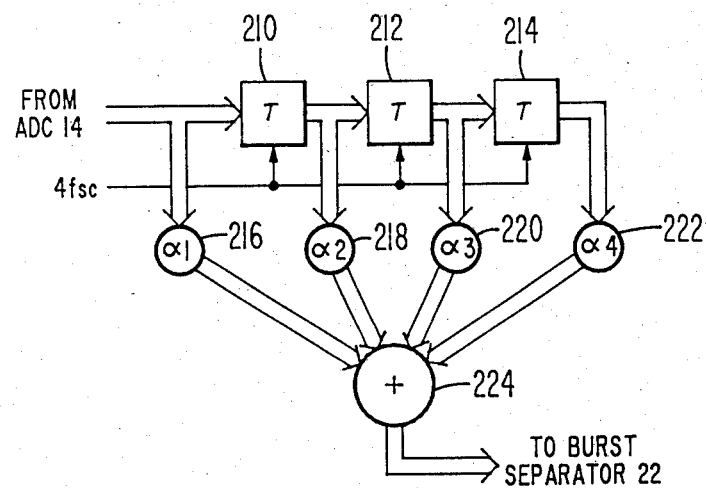
FIG. 2 is a block diagram of a digital band-pass filter suitable for use in the embodiment shown in FIG. 1.

FIG. 2 is a block diagram showing the structure of a band-pass filter and phase shifter suitable for use in the present embodiment. The filter and phase shifter shown in FIG. 2 is an output weighted FIR filter. Input samples are applied to three cascade connected delay elements 210, 212 and 214, each of which delays the samples by one period of the $4f_{sc}$ clock signal. Samples available at the input port of the filter and phase shifter and at the output ports of each of the delay elements 210, 212 and 214 respectively are applied to sample scalers 216, 218, 220 and 222. Sample scaler 216 multiplies the sample applied to the input port of the filter and phase shifter by a scale factor $\alpha_1$ and scalers 218, 220 and 222 multiply the samples provided by the respective delay elements 210, 212 and 214 by scale factors $\alpha_2$, $\alpha_3$ and $\alpha_4$ respectively. Weighted samples from the sample scalers are summed by adder 224 which produces the filtered and phase shifted output signal.

Values for the scaling factors $\alpha_1$ through $\alpha_4$ used in the present embodiment of the invention are given in Table I. Two values are given for each scaling factor, one representing the optimal value of the factor and the other, a close approximation which can be realized using a simplified shift-and-add multiplier.

TABLE I

| | Optimum | Approximation | Terms in approximation |
|---|---|---|---|
| $\alpha_1$ | .303 | .3125 | $\frac{1}{4} + 1/16$ |
| $\alpha_2$ | −.19686 | −.203125 | $-\frac{1}{8} - 1/16 - 1/64$ |
| $\alpha_3$ | −.303 | −.3125 | $-\frac{1}{4} - 1/16$ |
| $\alpha_4$ | .19686 | .203125 | $\frac{1}{8} + 1/16 + 1/64$ |

The weighting factors $\alpha_1$ through $\alpha_4$ configure the filter as an asymmetrical output weighted FIR filter. A filter having this configuration passes sample components having frequencies substantially equal to $f_{sc}$ and shifts the phase of this frequency signal, $f_{sc}$, by 33°.

Output samples from filter 20 are applied to multiplier 21. Multiplier 21 scales the filtered samples by a factor determined by automatic gain control (AGC) detector 26. AGC detector 26 and multiplier 21 maintain the peak amplitude of the burst signal within a predetermined range of values. The multiplier 21 may be a conventional eight-bit by eight-bit multiplier, however, a simplified shift-and-add multiplier may be used instead.

Multiplier 21 applies the scaled and filtered samples to burst separator 22. In the present embodiment, burst separator 22, under control of the burst gate signal, BG, from sync separator 12, extracts samples representing four cycles of the burst signal from each line of the filtered samples.

Filtered, phase shifted and scaled samples from burst separator 22 are applied to phase detector 24. Since the band-pass filter and phase shifter 20, used in this embodiment of the invention, shifts the phase of the NTSC burst signal by 33°, the zero-crossing points—which occurred at the R-Y phases of the unprocessed burst signal—occur at the I phases of the phase shifted burst signal.

Phase detector 24 averages the magnitude of I phase samples of the burst signal (i.e. those occurring coincident with the leading edges of the I CLK pulses) to produce a phase error signal. This phase error signal is used to lock the clock signals provided by timing processor 34 to the phase shifted burst signal. Consequently, timing processor 34 produces clock signals that are aligned with the I and Q phases of the unfiltered composite video signals.

Figure 3:
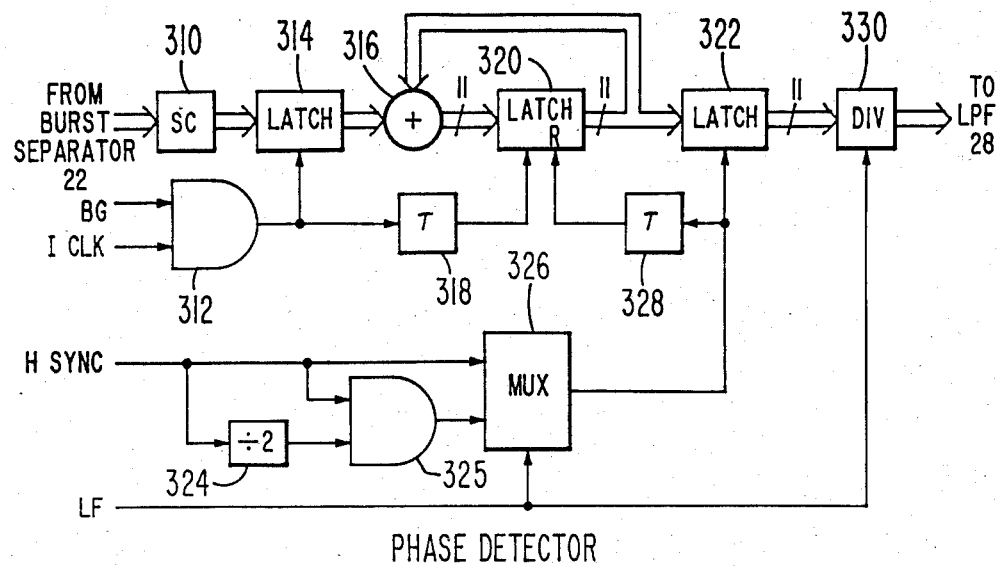
FIG. 3 is a block diagram of a phase detector suitable for use in the embodiment shown in FIG. 1.

FIG. 3 is the block diagram of a phase detector suitable for use in the present invention. Digital samples from separator 22 are applied to selective complementer circuit 310. Circuit 310 changes the polarity of selected samples to apply single polarity burst samples to latch 314. Samples are loaded into latch 314 on the leading edges of the clock pulses applied to the latch by AND gate 312. The clock signal provided by gate 312 is the logical AND of the I clock signal, I CLK, and the burst gate signal, BG, provided respectively by timing processor 34 and sync separator 12. The codewords stored in latch 314 are samples of the burst signal taken at the phase angle of the I color difference signal but shifted through filter 20 to correspond to the zero-crossing points of the color burst signal.

These samples are applied to an accumulator which includes adder 316 and latch 320. Adder 316 sums seven-bit samples provided by latch 314 with eleven-bit samples provided by latch 320. The samples produced by adder 316 are stored in latch 320 coincident with the leading edges of the clock pulses provided to latch 320 by delay element 318. Delay element 318 provides the clock signal from AND gate 312, delayed to compensate for the processing time through adder 316. The samples stored in latch 320 represent the accumulated sum of eight or sixteen burst samples as explained below. To preserve sample accuracy and to prevent overflow errors, the samples are stored as eleven-bit values.

The accumulated samples are transferred from latch 320 to latch 322 on the leading edge of the clock signal applied to latch 322. This clock signal is developed from the horizontal sync signal H SYNC. H SYNC is applied to frequency divider 324 and to one data input terminal of multiplexer 326. Frequency divider 324, which may be a conventional divide by two circuit, provides a signal at one-half of the horizontal line frequency to one input terminal of AND gate 325. The H SYNC signal is applied to the second input terminal of AND gate 325. AND gate 325 produces a signal having a period equal to two horizontal line periods and a pulse width equal to that of the horizontal sync pulse. This signal is applied to the second data input terminal of multiplexer 326. The control signal to multiplexer 326, LF, is in a logic low state until the PLL locks to the burst frequency and then switches to a logic high state. Multiplexer 326 is configured to apply H SYNC as a clock signal to latch 322 when LF is in a logic low state and to apply the signal from AND gate 325 when LF is in a logic high state. Consequently, when the PLL is locking, the samples transferred to latch 322 represent the accumulated sum of eight zero-crossing burst samples (i.e. the zero-crossing samples of four cycles in one burst interval). After the PLL has locked onto the burst signal, however, the samples transferred from latch 320 to latch 322 represent the accumulated sum of sixteen samples (i.e. the zero-crossing samples from four cycles of each of two sequential burst intervals). Latch 322 provides these samples to divider 330 which divides the sample values by 8 or 16 under control of signal LF. Divider 330 may be a conventional programmable bit-shifter which shifts the eleven-bit samples rightward to less significant bit positions by three bits when LF is in a logic low state and by four bits when LF is in a logic high state. The circuitry which generates signal LF is described below in reference to FIG. 1.

To understand the operation of the phase detector, assume that the signal produced by phase detector controls a VCO to match the phase and frequency of the signal produced by the VCO to the color burst reference signal. For weak signals, the amplitude of the color burst signal may be as low as 5 IRE peak-to-peak, while the range of signals which must be handled by the ADC is 140 IRE. When these weak signal burst samples are digitized by a seven-bit ADC, the quantization error is approximately eleven percent of the peak-to-peak value. Consequently, a phase detector similar to the one described above, but able to process only one line of samples, may be unable to achieve a phase accuracy of less than 10°. In addition, the phase of the signal produced by the VCO may jitter around the burst phase by ±10°.

To understand how this may occur, assume that the PLL has "locked" to the burst signal with a phase error of 10° per horizontal line. If the phase error for a particular line is 10°, the quantization error of the ADC may prevent the phase detector from detecting the error, and no correction signal may be produced. Consequently, the phase error on the next subsequent line may be 20°. The phase detector detects this error but it produces a correction signal proper for a phase error of 20° per line. This correction signal changes the phase error of the signal provided by the VCO from +10° per line to −10° per line. It can be demonstrated that a PLL using a phase detector which averages samples from only one line may continue to jitter between phase errors of +10° and −10° per line.

In the present PLL system, however, when an apparent phase lock is achieved using the samples from one line, the phase detector is switched to average samples from two sequential lines. In the example set forth above, the zero-valued samples from the line that has 10° phase error are averaged with the samples from the line that has a 20° phase error. This averaging produces a correction value that is appropriate for a 10° per line phase shift, exactly correcting the phase of the signal provided by the PLL. It can be shown that phase accuracies of less than ±5° can be achieved by averaging two lines of samples provided by a seven-bit ADC.

Although the present embodiment switches between averaging one and two lines of samples, it is contemplated that more lines of samples may also be averaged to achieve a more accurate lock. It is desirable, however, to average the samples from only one line to reach the initial locked state. This facilitates the correction of large phase errors (i.e. greater than 45° per line).

Referring again to FIG. 1, phase detector 24 provides phase error samples to low-pass filter 28 at the horizontal line rate. Low-pass filter 28, which may include an integrator develops a signal proportional to the accumulated sum of the phase error signals provided by phase detector 24. Filter 28 applies this signal to digital to analog converter (DAC) 30. DAC 30 changes the digital signal into an analog potential which is applied to VCO 32 to control the frequency of the signal provided by the VCO. VCO 32 may be a conventional voltage controlled oscillator which may have a free-running frequency that is determined by a piezoelectric crystal. Desirably, the resonant frequency of the crystal is close to $4f_{sc}$ (e.g. within 2 KHz of 14.31818 MHz for NTSC) to ensure that the PLL locks quickly and at the proper frequency.

VCO 32 applies a sinusoidal $4f_{sc}$ signal to timing processor 34. Processor 34 may include circuitry for generating a square wave $4f_{sc}$ clock signal from the sinusoidal input signal, and for generating the quadrature phase related I CLK and Q CLK signals, each at $2f_{sc}$. Details of processor 34 are not shown since it is not considered a part of the invention. Processor 34 may be built from conventional components by one skilled in the art.

Phase detector 24 applies accumulated zero-crossing samples to one input terminal of the comparator 38 which produces the signal LF. A reference source 36 provides a value to the second input of comparator 38. The value provided by source 36 represents the value produced by the phase detector when the PLL has achieved a coarse lock to the burst signal. The output signal of comparator 38, LF, is in a logic low state when the value applied by source 36 is less than the value provided by phase detector 24 and in a logic high state otherwise. Accordingly, LF is in a logic low state until the PLL has achieved a coarse lock and in a logic high state until the values provided by phase detector 24 indicate that the PLL is no longer synchronized to the burst signal.

The phase of the burst signal component of a composite video signal can change rapidly in response to changes in the source of broadcast signals. For example, a change between two programs may result in a change in the phase of the burst component of the composite video signal. Since the phase of the burst signal determines the hue of colors in the reproduced image, it is desirable for the PLL to be able to respond quickly to any change in the burst signal. To this end, the present PLL system includes an automatic gain control system comprising AGC detector 26 and multiplier 21. This AGC system maintains a desirable transient response characteristic for the PLL system.

AGC 26 develops a gain control signal from the samples which coincide with the Q clock signal. When the phase shifted samples that coincide with the I clock signal represent zero-crossing samples of the burst cycles, the samples that coincide with the Q clock represent the peaks of the burst cycles. AGC 26 averages these peak samples over one burst interval to produce a gain control signal which is applied to multiplier 21 to increase or decrease the magnitude of the filtered burst samples.

When the peaks of the phase shifted burst signal do not occur coincident with the Q clock pulses, the averaged peak value developed by AGC detector 26 may be less than the actual peak value of the burst. Moreover, for phase errors greater than 45°, the average value of the Q burst samples may be less than the average value of the I samples. In these instances, AGC detector 26 may apply a gain facter to multiplier 21 that is larger than would be applied if detector 26 averaged the actual peak values of the burst signal. Multiplier 21 scales all of the burst samples by this gain factor, including the I samples which are averaged by the phase detector 24 to develop the phase error signal. When the magnitude of the I samples is increased, the amplitude of the phase error signal provided by phase detector 24 is increased, causing the frequency of signal provided by the VCO to change more quickly than if the magnitude of the I samples had not been increased. As the frequency of the signal provided by the VCO approaches a harmonic of the burst frequency, the value of the Q samples approach the peak value of the burst signal, and the gain factor developed by AGC detector 26 decreases, approaching its proper value. As the gain factor decreases and the PLL approaches a locked state, the magnitude of the I samples and the phase error signal developed from them decreases, slowing the rate at which the frequency of the signal provided by the VCO changes.

The rate at which the frequency of the signal provided by the VCO changes is proportional to the average value of the phase error between the individual cycles of the signal provided by the VCO and the burst signal. Consequently, the rate at which the loop approaches a locked state is generally higher than for a PLL without AGC circuitry or for a PLL having an AGC which determines the gain factor based on the values of both the zero-crossing and peak samples.

What is claimed is:

1. In an electronic signal processing system including a source of reference signal which has a component at a predetermined frequency and phase, a phase locked loop comprising:

signal filtering means coupled to said source for attenuating components of said reference signal having undesirable frequencies relative to the component at said predetermined frequency and for shifting the phase of said reference signal to provide a signal having a predetermined phase relationship with respect to said reference signal;

means for generating an oscillatory signal having a control input terminal and being responsive to signals applied to said control input terminal for varying the frequency of said oscillatory signal;

phase detecting means coupled to said filtering means and to said signal generating means for developing a correction signal representing the difference in phase between the signal provided by said filtering means and said oscillatory signal; and means for coupling said correction signal to the control input terminal of said signal generating means.

2. The system set forth in claim 1 wherein:

said source provides digital samples representing said reference signal; and said filtering means comprises a digital filter.

3. The system set forth in claim 2 wherein said filtering means comprises an asymmetrically weighted FIR filter.

4. The system set forth in claim 3 wherein said filtering means comprises a four tap output weighted FIR filter, said four taps being weighted by the factors 0.303, −1.9686, −0.303, 1.9686 respectively in order of increasing delay.

5. The system set forth in claim 3 wherein said filtering means comprises a four tap output weighted FIR filter, said four taps being weighted by the factors 0.3125, −2.03125, −0.3125, 2.03125 respectively in order of increasing delay.

6. The system set forth in claim 3 wherein said filtering means comprises a four tap output weighted FIR filter, said four taps being weighted by the factors 0.303, −1.9686, −0.303, 1.9686 respectively in order of increasing delay.

7. The system set forth in claim 3 wherein said filtering means comprises a four tap output weighted FIR filter, said four taps being weighted by the factors 0.3125, −2.03125, −0.3125, 2.03125 respectively in order of increasing delay.

8. The system set forth in claim 2 wherein:

said signal generating means includes means for providing a clocking signal having a frequency approximately proportional to the signal provided by said filtering means; and said phase detecting means is responsive to said clocking signal and to the sampled digital signal provided by said filtering means for developing a correction signal representing the magnitude of the digital samples provided by said filtering means at instants determined by said clocking signal.

9. The system set forth in claim 8 wherein said phase detecting means accrues a sum of the magnitudes of the samples provided by said filtering means occurring at instants approximately corresponding to zero-crossing points of said reference signal as determined by said clocking signal.

10. In a video signal processing system including a source of composite video signal having a color reference burst signal component that has a predetermined frequency and phase, a phase locked loop comprising:

signal filtering means coupled to said source for passing said color reference burst signal to the relative exclusion of other components and for shifting the phase of said color reference burst signal to provide a signal having a predetermined phase relationship with said color reference burst signal;

means for generating an oscillatory signal having a control input terminal and being responsive to signals applied to said control input terminal for varying the frequency of said oscillatory signal;

phase detecting means coupled to said filtering means and to said signal generating means for developing a correction signal representing the difference in phase between the signal provided by said filtering means and said oscillatory signal; and means for coupling said correction signal to the control input terminal of said signal generating means.

11. The system set forth in claim 10 wherein:

said system includes an analog to digital converter coupled between said source and said filtering means for providing digital samples representing the color burst reference signal to said filtering means; and said filtering means comprises a digital filter.

12. The system set forth in claim 11 wherein said filtering means comprises an asymmetrically weighted FIR filter.

13. The system set forth in claim 12 wherein said filtering means comprises a four tap output weighted FIR filter, said four taps being weighted by the factors 0.303, −1.9686, −0.303, 1.9686 respectively in order of increasing delay.

14. The system set forth in claim 13 wherein said filtering means comprises a four tap output weighted FIR filter, said four taps being weighted by the factors 0.3125, −2.03125, −0.3125, 2.03125 respectively in order of increasing delay.

15. The system set forth in claim 11 wherein:

said signal generating means includes means for providing a clocking signal having a frequency approximately proportional to the signal provided by said filtering means; and said phase detecting means is responsive to said clocking signal and to the sampled digital signal provided by said filtering means for developing a correction signal representing the magnitude of the digital samples provided by said filtering means at instants determined by said clocking signal.

16. The system set forth in claim 15 wherein:

said phase detecting means accrues a sum of the magnitudes of the samples provided by said filtering means occurring at instants approximately corresponding to the zero crossing points of said reference signal as determined by said clocking signal.

17. In a video signal processing system including a source of composite video signal having a chrominance signal component modulating a suppressed chrominance subcarrier signal, said chrominance signal component including a color reference burst signal component having the same frequency as said chrominance subcarrier signal and a predetermined phase relationship with respect to said chrominance subcarrier signal, a phase locked loop comprising:

filtering means coupled to said source for attenuating components of said color reference burst signal having undesirable frequencies relative to the component at the frequency of said chrominance subcarrier signal and for changing the phase of said color reference burst signal to provide a signal having a phase relationship with said chrominance subcarrier signal substantially corresponding to the phase relationship between one of said I and Q color difference signal components and said chrominance subcarrier signal;

means for generating an oscillatory signal having a control input terminal and being responsive to signals applied to said control input for varying the frequency of said oscillatory signal;

phase detecting means coupled to said filtering means and to said signal generating means for developing a correction signal representing the difference in phase between the signal provided by said filtering means and said oscillatory signal; and means for coupling said correction signal to the control input terminal of said signal generating means.

18. The system set forth in claim 17 wherein:

said system includes an analog to digital converter coupled between said source and said filtering means for providing digital samples representing the color reference burst signal to said filtering means; and said filtering means comprises a digital filter.

19. The system set forth in claim 18 wherein said filtering means comprises an asymmetrically weighted FIR filter.

20. The system set forth in claim 19 wherein said filtering means changes the phase of said burst samples by 33°.

21. The system set forth in claim 18 wherein:

said signal generating means includes means for providing a clocking signal having a frequency approximately proportional to the signal provided by said filtering means; and said phase detecting means is responsive to said clocking signal and to the sampled digital signal provided by said filtering means for developing a correction signal representing the magnitude of the digital samples provided by said filtering means at instants determined by said clocking signal.

22. The system set forth in claim 21 wherein:

said phase detecting means accrues a sum of the magnitudes of the samples provided by said filtering means occurring at instants approximately corresponding to zero-crossing points of said reference signal as determined by said clocking signal.

* * * * *